United States Patent [19]

Johannesen

[11] Patent Number: 5,226,511
[45] Date of Patent: Jul. 13, 1993

[54] SPRING ACTIVATED AUTOMATIC DRUM BRAKE ADJUSTER

[75] Inventor: Donald D. Johannesen, South Bend, Ind.

[73] Assignee: Allied-Signal Inc., Morristown, N.J.

[21] Appl. No.: 967,581

[22] Filed: Oct. 28, 1992

[51] Int. Cl.⁵ .......................................... F16D 65/56
[52] U.S. Cl. ......................... 188/79.54; 188/79.61; 188/106 A; 188/106 F; 188/196 D; 192/111 A
[58] Field of Search ............... 188/79.51, 79.54, 79.62, 188/196 D, 106 F, 106 A; 192/111 A

[56] References Cited

U.S. PATENT DOCUMENTS

| | | | |
|---|---|---|---|
| Re. 28,412 | 5/1975 | Farr | 188/196 D X |
| 3,285,375 | 11/1966 | Jeppsson et al. | 188/196 |
| 4,243,124 | 1/1981 | Kluger | 188/79.5 |
| 4,441,591 | 4/1984 | Severinsson et al. | 188/202 |
| 4,493,401 | 1/1985 | Sander et al. | 188/199 |
| 4,593,797 | 6/1986 | Schmitt | 188/196 D |
| 4,662,485 | 5/1987 | Kanjo et al. | 188/196 D |
| 4,742,897 | 5/1988 | Hiroshi et al. | 88/79.51 X |
| 4,779,711 | 10/1988 | Fabbro et al. | 188/196 D |
| 4,784,245 | 11/1988 | Fabbro et al. | 188/196 D |
| 4,833,975 | 5/1989 | Rocholl et al. | 92/63 |
| 4,840,257 | 6/1989 | Harrison | 188/196 D |
| 4,842,103 | 6/1989 | Weller et al. | 188/71.9 |

Primary Examiner—George E. A. Halvosa
Attorney, Agent, or Firm—Larry J. Palguta; Ken C. Decker

[57] ABSTRACT

The automatic adjuster (5) for the drum brake (6) comprises first and second oppositely disposed end members (30, 40) each having slots (32, 42) for receiving nonrotatably brake shoe webs (10, 14) and a parking lever (22). The first end member (30) includes a radially expanded end portion (34) defining an interior cavity (36) with a conically shaped surface (38). The second end member (40) is connected with a rotatable starwheel flange (44) of a longitudinally extended shaft (48) having therein a threaded opening (49), the starwheel flange (44) immobilized by a return spring (16) of the brake (6). An intermediate member (50) has at one end a threaded shaft (52) which is received threadedly within the threaded opening (49) of the shaft (48) and at the other end a conically shaped member (54) which engages the conically shaped surface (38) of the first end member (30). Located rotatably about the intermediate member (50) and adjacent the conically shaped member (54) is a bearing member (60) having a radially extending surface (69) located within the interior cavity (36) and disposed a predetermined distance or running clearance (X) from a radial surface (58) of the conically shaped member (54), and an exterior radially extending flange (62) having one radial surface (66) engaging a radial surface (39) of the first end member (30) and an opposite radial surface (7) of the flange (62) engaged by a spring (70) which extends to engage the starwheel flange (44). When the drum brake shoes (8, 12) are activated and the running clearance (X) between the conically shaped member (54) and bearing member (60) is exceeded, the intermediate member (50) moves the bearing member (60) so that the bearing member flange (62) disengages the radial surface (39) of the first end member (30) and the biasing force of the spring (70) causes the intermediate member (50) to rotate relative to the shaft (48) and second end member (40) and effect expansion of the automatic adjuster (5).

12 Claims, 1 Drawing Sheet

SPRING ACTIVATED AUTOMATIC DRUM BRAKE ADJUSTER

The present invention relates generally to automatic adjusters for drum brakes, and in particular to a spring activated automatic drum brake adjuster Automatic adjusters for drum brakes have been provided for many years. It is highly desirable for drum brake automatic adjusters to operate easily and quickly, and be reset easily to an initial length after worn drum brake shoes have been replaced with new drum brake shoes. The automatic adjuster should comprise as few parts as possible, be easily and inexpensively manufactured, and be highly reliable.

The present invention provides solutions to the above problems by providing an automatic adjuster for a drum brake, comprising oppositely disposed first and second end members each having reception means for nonrotatable engagement with a respective drum brake shoe, the first end member having a radially expanded end portion defining therein a cavity which includes a conically shaped surface, the second end member connected with a longitudinally extended shaft having a threaded opening therein, an intermediate member disposed between the first and second end members and having at one end a threaded shaft received within said threaded opening and the other end including a conically shaped member engaging the conically shaped surface of the first end member and having a radial surface, a bearing member disposed about the intermediate member and adjacent the conically shaped member, the bearing member having a radially extending flange engaging the end portion of the first end member and a radially extending surface engageable with the radial surface of said conically shaped member, and a spring member located about said longitudinally extended shaft and intermediate member such that one spring end engages said longitudinally extended shaft and the other spring end engages the flange of the bearing member, the spring biasing the flange of the bearing member into engagement with the end portion of the first end member, the conically shaped surface engaged by the conically shaped member such that the radial surface of the conically shaped member is disposed a predetermined distance from said radially extending surface of the bearing member to define a running clearance for the drum brake.

One way of carrying out the invention is described in detail below with reference to the drawings which illustrate an embodiment in which.

Figure 1:
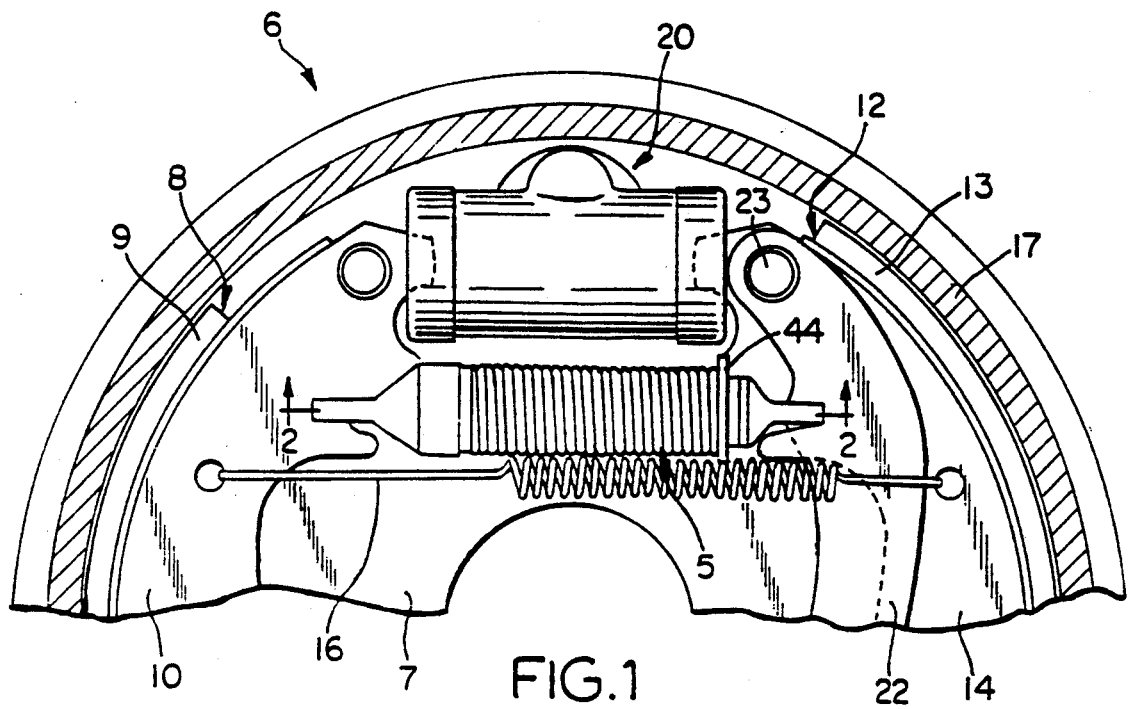
FIG. 1 is a fragmentary cross-sectional view of a drum brake assembly having the automatic adjuster in accordance with the present invention.
Figure 2:
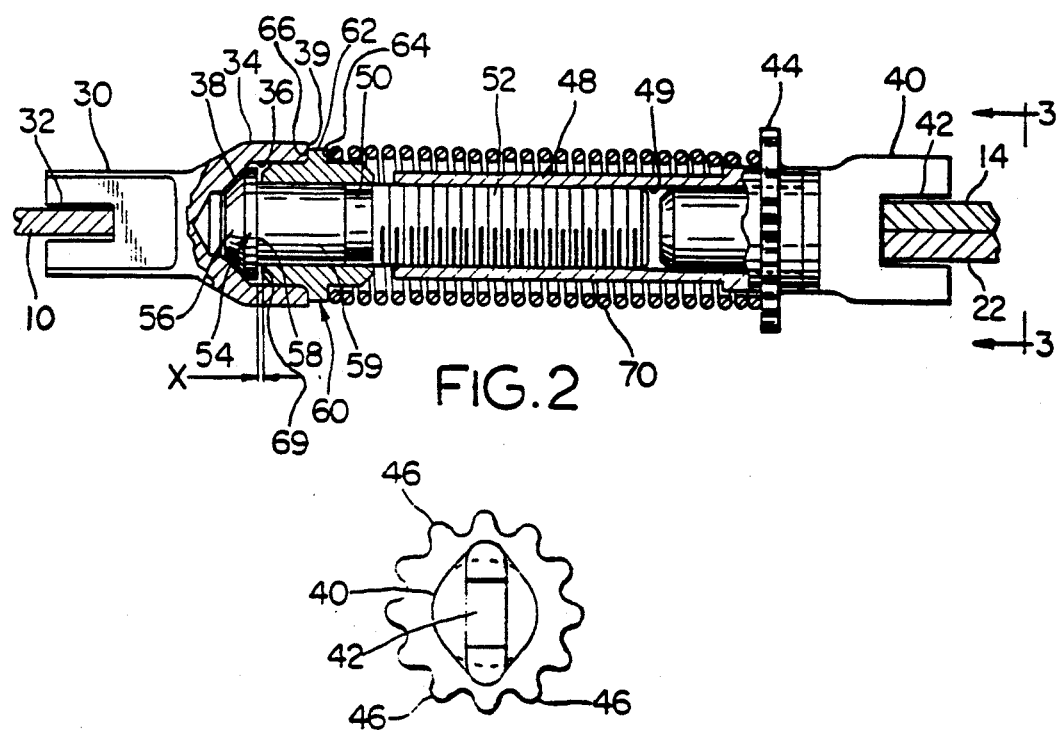
FIG. 2 is an enlarged fragmentary cross-section view taken along view line 2—2 of FIG. 1.

Referring to FIG. 1, a drum brake is identified generally by reference numeral 6 and includes a pair of spaced-apart drum brake shoes 8, 12 having respective friction material linings 9, 13 and webs 10, 14. Drum brake shoes 8 and 12 are positioned adjacent rotatable drum 17, and are located on backing plate 7. A wheel brake cylinder 20 is located between opposite ends of the brake shoes 8 and 12 for actuation thereof, and brake shoe 12 includes pin 23 for supporting parking lever 22. Return spring 16 biases brake shoes 8, 12 toward each other and engages flange 44 to keep longitudinal shaft 48 (FIG. 2) from rotating during operation of the brake. Spring 16 acts as a detent against the flange 44 in order to render shaft 48 manually rotatable during servicing of the brake. Located between brake shoes 8 and 12 is the automatic adjuster of the present invention designated generally by reference numeral 5. Automatic adjuster 5 comprises a spring activated automatic drum brake adjuster having first end member 30 (see FIG. 2) with slot 32 for engaging nonrotatably web 10 of brake shoe 8. First end member 30 extends to radially expanded end portion or housing 34 defining interior cavity 36 having conically shaped surface 38. Housing 34 also includes end or radial surface 39. Second end member 40 includes slot 42 for receiving and engaging nonrotatably web 14 of drum brake shoe 12 and parking lever 22. Second end member 40 extends longitudinally to mount rotatably a longitudinal shaft 48 having radially extending flange 44 with a plurality of radially extending lobes 46 (see FIG. 3) to comprise a starwheel shaped rotatable flange member. Longitudinal shaft 48 includes interior threaded opening 49. Intermediate member 50 includes longitudinally extending threaded shaft 52 received threadedly within threaded opening 49. Threaded shaft 52 comprises a high lead screw so that intermediate member 50 will rotate easily relative to second member 40. Intermediate member 50 includes conically shaped member 54 having conical surface 56 engaging conically shaped surface 38. Conical shaped member 54 includes radial surface 58 located adjacent an axially extending smooth surface portion 59. Disposed about smooth surface portion 59 is bearing member 60 which includes radially extending flange 62 having opposing radial surfaces 64 and 66. Bearing member 60 also includes radially extending surface 69 located adjacent radial surface 58 of conically shaped member 54. Spring member 70 extends between flange 44 of second end member 40 and radial surface 64 of bearing member 60. As illustrated in FIG. 2, a predetermined distance "X" between radial surfaces 58 and 69 comprises the running clearance of the drum brake shoes.

Figure 3:
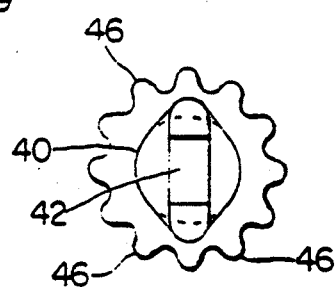
FIG. 3 is an end view of the automatic adjuster of FIG. 2.

When the drum brake is in an inoperative mode as illustrated in FIGS. 1–3, end members 30 and 40 engage respective webs 10 and 14/parking lever 22. End members 30 and 40 are biased apart by spring 70 and bearing member 60. Radial surface 66 engages radial surface 39 of first end member 30 and the frictional engagement therebetween prevents bearing member 60 from rotating relative to second end member 40. Conically shaped surface 38 of first end member 30 is engaged by conical surface 56 of conically shaped member 54 and the friction therebetween prevents rotation of intermediate member 50 relative to second end member 40. As described above, the axial separation "X" between surfaces 58 and 69 comprises the running clearance of the drum brake shoes, i.e. the distance which the shoes are spaced apart from drum 17 When the vehicle operator presses a not shown brake pedal and actuates wheel brake cylinder 20, drum brake shoes 8 and 12 are displaced away from one another and friction materials 9 and 13 engage the rotating drum to effect braking of the vehicle. When drum brake shoe 12 moves away from drum brake shoe 8 and the respective first and second end members follow therewith as a result of the biasing force of spring 70, automatic adjuster 5 will not operate to extend its length as long as the running clearance "X" is not exceeded. However, if due to the wear of friction materials 9 and 13 the running clearance "X" is exceeded, radial surface 58 will engage radially extending surface 69 of bearing member 60 and move flange 62 away from radial surface 39 of first end member 30. This occurs as a result of intermediate member 50 being threadedly coupled with second end member 40 that moves with web 14. Once radial surface 66 of bearing member 60 disengages from radial surface 39 of first end member 30, the biasing force of spring 70 against flange 62 is transferred via the engagement of surfaces 69 and 58 to conically shaped member 54 (conical surface 56 is disengaged from conically shaped surface 38 upon initial brake actuation) to cause intermediate member 50 to rotate relative to longitudinal shaft 48 and extend relative thereto. Threaded shaft 52 which engages threaded opening 49 of shaft 48 comprise threads with a high lead such that intermediate member 50 rotates easily relative to shaft 48 and second end member 40. When brake actuation is terminated by the vehicle operator, brake shoes 8 and 12 return toward each other by means of return spring 16 as wheel brake cylinder 20 is deactivated. Intermediate member 50 is moved by second end member 40 and brake shoe web 14/parking lever 22 toward first end member 30 such that flange 62 of bearing member 60 engages radial surface 39 and then radial surface 58 of conically shaped member 54 separates from radially extending surface 69 of bearing member 60 and conical surface 56 engages conically shaped surface 38 of first end member 30. The frictional engagement between surfaces 66, 39 and 56, 38 prevents the respective parts from rotating relative to one another.

I claim:

1. An automatic adjuster for a drum brake, comprising oppositely disposed first and second end members each having reception means for nonrotatable engagement with a respective drum brake shoe, the first end member having a radially expanded end portion defining therein a cavity which includes a conically shaped surface, the second end member connected with a longitudinally extended shaft having a threaded opening therein, an intermediate member disposed between the first and second end members and having at one end a threaded shaft received within said threaded opening and the other end including a conically shaped member engaging the conically shaped surface of the first end member and having a radial surface, a bearing member disposed about the intermediate member and adjacent the conically shaped member, the bearing member having a radially extending flange engaging the end portion of the first end member and a radially extending surface engageable with the radial surface of said conically shaped member, and a spring member located about said longitudinally extended shaft and intermediate member such that one spring end engages said longitudinally extended shaft and the other spring end engages the flange of the bearing member, the spring biasing the flange of the bearing member into engagement with the end portion of the first end member, the conically shaped surface engaged by the conically shaped member such that the radial surface of the conically shaped member is disposed a predetermined distance from said radially extending surface of the bearing member to define a running clearance for the drum brake.

2. The automatic adjuster in accordance with claim 1, in combination with a drum brake which includes the drum brake shoes, each shoe engaging a respective reception means and one of the reception means also receiving a parking lever.

3. The automatic adjuster and drum brake in accordance with claim 2, further comprising a flange member extending radially from said longitudinally extended shaft to enable rotation of said longitudinally extended shaft relative to the second end member when the automatic adjuster is being reset to a contracted position.

4. The automatic adjuster in accordance with claim 3, wherein the flange member comprises a plurality of radially extending lobes to provide for manual handling thereof.

5. The automatic adjuster in accordance with claim 1, wherein the intermediate member includes a longitudinally extending smooth surface portion adjacent the conically shaped member and about which the bearing member is located for rotation relative thereto.

6. The automatic adjuster in accordance with claim 1, further comprising a return spring between the drum brake shoes and which engages the longitudinally extended shaft.

7. A drum brake having an automatic adjuster, comprising a wheel cylinder, drum brake shoes, resilient means biasing the drum brake shoes toward one another, and an automatic adjuster located between said drum brake shoes, the automatic adjuster comprising oppositely disposed first and second end members each engaging nonrotatably a respective drum brake shoe, the first end member having a radially expanded end portion defining therein a cavity which includes a conically shaped surface, the second end member connected with a longitudinally extended shaft having a threaded opening therein, an intermediate member disposed between the first and second end members and having at one end a threaded shaft received within said threaded opening and the other end including a conically shaped member engaging the conically shaped surface of the first end member and having a radial surface, a bearing member disposed about the intermediate member and adjacent the conically shaped member, the bearing member having a radially extending flange engaging the end portion of the first end member and a radially extending surface engageable with the radial surface of said conically shaped member, and a spring member located about said longitudinally extended shaft and intermediate member such that one spring end engages said longitudinally extended shaft and the other spring end engages the flange of the bearing member, the spring biasing the flange of the bearing member into engagement with the end portion of the first end member, the conically shaped surface engaged by the conically shaped member such that the radial surface of the conically shaped member is disposed a predetermined distance from said radially extending surface of the bearing member to define a running clearance for the drum brake.

8. The brake in accordance with claim 7, wherein the automatic adjuster further comprises a flange member extending radially from said longitudinally extended shaft to enable rotation of said longitudinally extended shaft relative to the second end member when the automatic adjuster is being reset to a contracted position.

9. The brake in accordance with claim 8, wherein the flange member comprises a plurality of radially extending lobes to provide for manual handling thereof.

10. The brake in accordance with claim 8, wherein the intermediate member includes a longitudinally extending smooth surface portion adjacent the conically shaped member and about which the bearing member is located for rotation relative thereto.

11. The brake in accordance with claim 10, wherein each end member comprises reception means for effecting the nonrotatable engagement with the respective drum brake shoe.

12. The automatic adjuster in accordance with claim 5, further comprising a return spring between the drum brake shoes and which engages the longitudinally extended shaft.

* * * * *